United States Patent
McKay et al.

(10) Patent No.: US 9,670,830 B2
(45) Date of Patent: Jun. 6, 2017

(54) METHOD AND APPARATUS FOR MONITORING A COOLANT SYSTEM FOR AN EXHAUST GAS RECIRCULATION SYSTEM

(71) Applicant: GM GLOBAL TECHNOLOGY OPERATIONS LLC, Detroit, MI (US)

(72) Inventors: Kevin J. McKay, New Hudson, MI (US); Chad E. Marlett, Plymouth, MI (US); Steve L. Melby, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 211 days.

(21) Appl. No.: 14/527,082

(22) Filed: Oct. 29, 2014

(65) Prior Publication Data

US 2016/0123278 A1   May 5, 2016

(51) Int. Cl.
  *F02B 29/04*   (2006.01)
  *F02D 41/00*   (2006.01)
  *F02M 26/25*   (2016.01)
  *F02M 26/33*   (2016.01)

(52) U.S. Cl.
  CPC ...... *F02B 29/0493* (2013.01); *F02D 41/0065* (2013.01); *F02M 26/25* (2016.02); *F02M 26/33* (2016.02); *F02D 2041/0067* (2013.01); *Y02T 10/146* (2013.01); *Y02T 10/47* (2013.01)

(58) Field of Classification Search
  CPC .......................................... F02M 26/22–26/33
  USPC ....... 701/103, 108, 114; 123/568.11–568.32, 123/676; 73/114.68, 114.74; 60/605.2
  See application file for complete search history.

(56) References Cited

U.S. PATENT DOCUMENTS

| | | | | |
|---|---|---|---|---|
| 6,848,434 B2* | 2/2005 | Li | ............ | F02M 26/47 |
| | | | | 123/568.12 |
| 7,881,858 B2* | 2/2011 | Kress | .................. | F02D 41/0002 |
| | | | | 123/568.16 |
| 8,342,015 B2* | 1/2013 | Allard | ................. | G01M 15/102 |
| | | | | 73/114.74 |
| 8,725,386 B2* | 5/2014 | Khair | .................. | F02D 41/0065 |
| | | | | 123/568.11 |
| 8,769,931 B2* | 7/2014 | Nam | .................... | F02D 41/0072 |
| | | | | 60/277 |
| 9,109,481 B2* | 8/2015 | Martin | ...................... | F01N 5/02 |
| 2006/0042608 A1* | 3/2006 | Buck | ................... | F02B 29/0437 |
| | | | | 123/568.12 |
| 2009/0229802 A1* | 9/2009 | Ishimori | ................... | F28D 7/16 |
| | | | | 165/163 |
| 2010/0051001 A1* | 3/2010 | Webb | ..................... | F02M 26/33 |
| | | | | 123/568.12 |
| 2010/0307231 A1* | 12/2010 | Allard | .................... | F02M 26/47 |
| | | | | 73/114.74 |
| 2011/0224948 A1* | 9/2011 | Cianflone | .............. | F02M 26/33 |
| | | | | 702/183 |

(Continued)

*Primary Examiner* — Carlos A Rivera
*Assistant Examiner* — Carl Staubach
(74) *Attorney, Agent, or Firm* — Quinn IP Law

(57) ABSTRACT

A method for monitoring an internal combustion engine includes monitoring thermal efficiency in a heat exchanger of an exhaust gas recirculation (EGR) system with a flow control valve commanded to a first, open state and monitoring thermal efficiency in the heat exchanger with the flow control valve commanded to a second, closed state. The flow control valve is evaluated based upon the monitored efficiencies.

10 Claims, 2 Drawing Sheets

(56) References Cited

U.S. PATENT DOCUMENTS

| | | | |
|---|---|---|---|
| 2011/0247407 A1* | 10/2011 | Allard | G01M 15/102 |
| | | | 73/114.74 |
| 2012/0290190 A1* | 11/2012 | Kim | F02M 26/49 |
| | | | 701/102 |
| 2012/0312001 A1* | 12/2012 | Nam | F02D 41/221 |
| | | | 60/299 |
| 2013/0312716 A1 | 11/2013 | Balestrino et al. | |
| 2014/0288801 A1* | 9/2014 | Sasaki | F02D 41/0065 |
| | | | 701/102 |
| 2015/0128916 A1* | 5/2015 | Surnilla | F02M 25/0753 |
| | | | 123/568.12 |

* cited by examiner

METHOD AND APPARATUS FOR MONITORING A COOLANT SYSTEM FOR AN EXHAUST GAS RECIRCULATION SYSTEM

TECHNICAL FIELD

The disclosure relates to internal combustion engines, and monitoring thereof.

BACKGROUND

The statements in this section merely provide background information related to the present disclosure and may not constitute prior art.

Known internal combustion engines may be configured with exhaust gas recirculation (EGR) systems to reduce emissions of nitrogen oxides (NOx) by reducing peak combustion temperatures within the engine cylinders during transient and steady-state operating conditions. Known EGR systems divert flow of a portion of exhaust gas into an intake system of the engine, and include a controllable EGR valve, an EGR cooling system including a heat exchanger, and suitable piping elements. Flow of the EGR gas in the direction of the intake system may be induced by a pressure differential between the intake and exhaust systems.

SUMMARY

A method for monitoring an internal combustion engine includes monitoring thermal efficiency in a heat exchanger of an exhaust gas recirculation (EGR) system with a flow control valve commanded to a first, open state and monitoring thermal efficiency in the heat exchanger with the flow control valve commanded to a second, closed state. The flow control valve is evaluated based upon the monitored efficiencies.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
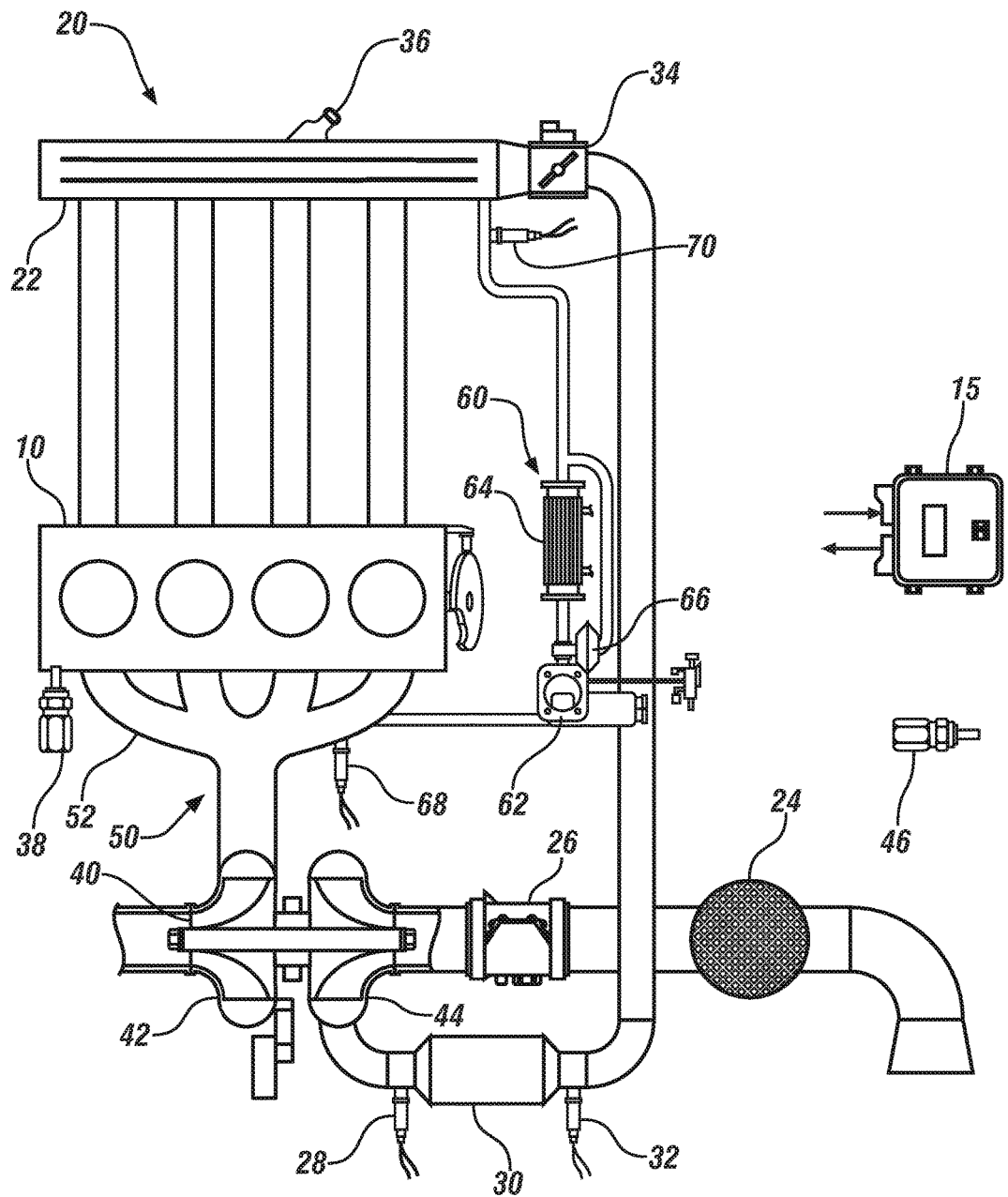
FIG. 1 schematically illustrates an internal combustion engine (engine) and accompanying engine controller in accordance with the disclosure.

Referring now to the drawings, wherein the depictions are for the purpose of illustrating certain exemplary embodiments only and not for the purpose of limiting the same, FIG. 1 schematically illustrates an internal combustion engine (engine) 10 and accompanying engine controller 15 that have been constructed in accordance with this disclosure. The illustrated engine 10 is a compression-ignition engine configured to operate at an air/fuel ratio that is primarily lean of stoichiometry in one embodiment, although the disclosure is not so limited. The disclosure may be applied to any internal combustion engine system that includes a heat exchanger and associated bypass valve as elements of an exhaust gas recirculation (EGR) system.

The exemplary engine 10 includes a multi-cylinder direct-injection four-stroke internal combustion engine having an air intake system 20, an exhaust system 50 and an EGR system 60. The air intake system 20 provides intake air to an intake manifold 22 that distributes and directs air into intake runners of the engine combustion chambers. The air intake system 20 has airflow ductwork and devices for monitoring and controlling the air flow. Devices for controlling the air flow include an intake air filter 24, a charge air cooler 30 and an intake throttle valve 34. The throttle valve 34 preferably includes an electronically controlled device that controls airflow to the engine 10 in response to a control signal from the engine controller 15. Temperature sensors 28 and 32 monitor temperatures upstream and downstream, respectively, of the charge air cooler 30. An intake air compressing device 40 includes an intake air compressor 44 which is driven by an exhaust turbine 42 fluidly coupled to the exhaust system 50. Devices for monitoring the air flow preferably include a mass airflow sensor 26, which monitors intake mass airflow (MAF), intake air temperature (IAT1, IAT2), air humidity (HUM) and inlet air pressure (IAP). A pressure sensor 36 in the intake manifold 22 monitors manifold absolute pressure (MAP) and barometric pressure (BARO). A coolant temperature sensor 38 monitors engine coolant temperature.

An exhaust manifold 52 entrains exhaust gases output from the engine 10 and channels them through the exhaust turbine 42 of the intake air compressing device 40 to an exhaust purification and aftertreatment system. An exhaust gas recirculation (EGR) system 60 recirculates a portion of the exhaust gases to the intake manifold 20 through a flow control valve referred to as an EGR valve 62. The EGR system 60 includes an EGR cooler 64 with flow therethrough controlled by a bypass valve 66. The EGR cooler bypass valve 66 employs any suitable actuator, including, e.g., a pneumatic actuator to effect valve opening and closing. Monitoring of the EGR system 60 includes an EGR inlet temperature sensor 68 and an EGR outlet temperature sensor 70. The engine controller 15 controls mass flow of exhaust gas to the intake manifold 22 by controlling opening of the EGR valve 62.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated memory and storage devices (read only, programmable read only, random access, hard drive, etc.) executing one or more software or firmware programs or routines, combinational logic circuit(s), input/output circuit(s) and devices, signal conditioning and buffer circuitry and other components to provide a described functionality. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of an event. Communications between controllers and between controllers, actuators and/or sensors may be accomplished using a direct wired link, a networked communications bus link, a wireless link or any another suitable communications link.

Monitoring the internal combustion engine includes monitoring individual systems and components to determine that they are operating as intended throughout the service life of the vehicle. One monitoring routine described with reference to FIG. 2 includes monitoring thermal efficiency in the heat exchanger, i.e., cooler 64 of the exhaust gas recirculation (EGR) system 60 to monitor operation of the EGR cooler bypass valve 66. This includes monitoring thermal efficiency in the heat exchanger with the EGR cooler bypass valve 66 commanded to a first, open state and monitoring thermal efficiency with the EGR cooler bypass valve 66 commanded to a second, closed state, and evaluating the EGR cooler bypass valve 66 based upon the monitored efficiencies. Such a monitoring routine can be advantageously implemented on an EGR system that includes an EGR cooler bypass valve that has no direct feedback from a monitoring sensor such as a valve position feedback sensor.

Figure 2:
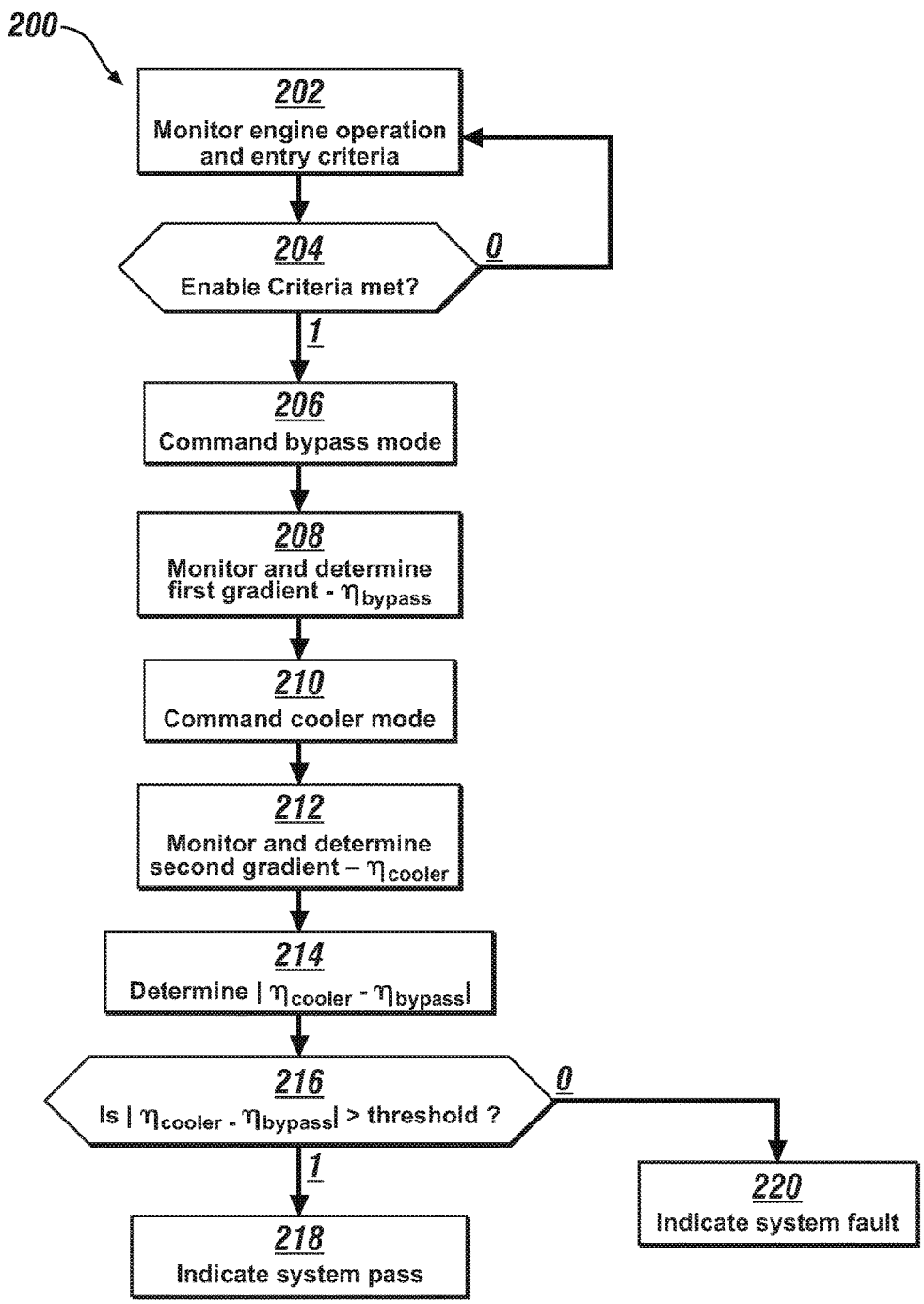
FIG. 2 schematically shows a monitoring routine for evaluating thermal efficiency of an EGR cooler during ongoing vehicle operation to evaluate operation of an EGR cooler bypass valve, in accordance with the disclosure.

FIG. 2 schematically shows a monitoring routine 200 for evaluating thermal efficiency of an EGR cooler during ongoing vehicle operation to evaluate operation of the EGR cooler bypass valve. By way of a non-limiting example, the monitoring routine 200 can be employed to monitor an embodiment of the system described with reference to FIG. 1. When implemented on-vehicle, the monitoring routine 200 includes algorithms, control routines, calibrations and other elements that are system-specific and not described herein. The monitoring routine 200 preferably executes once per key-on cycle. Table 1 is provided as a key wherein the numerically labeled blocks and the corresponding functions are set forth as follows, corresponding to the monitoring routine 200.

TABLE 1

| BLOCK | BLOCK CONTENTS |
| --- | --- |
| 202 | Monitor engine operation and entry criteria |
| 204 | Enable Criteria met? |
| 206 | Command bypass mode |
| 208 | Monitor and determine first gradient - $\eta_{bypass}$ |
| 210 | Command cooler mode |
| 212 | Monitor and determine second gradient - $\eta_{cooler}$ |
| 214 | Determine $|\eta_{cooler} - \eta_{bypass}|$ |
| 216 | Is $|\eta_{cooler} - \eta_{bypass}|$ > threshold? |
| 218 | Indicate system pass |
| 220 | Indicate system fault |

Operating and control parameters associated with the engine and the EGR system are periodically monitored during vehicle and powertrain operation (202) to determine whether the engine and EGR system are in a condition that permits an accurate evaluation of the operation of the EGR cooler bypass valve (204). Such parameters include EGR flowrate, fuel injection mass, engine speed, engine coolant temperature and a commanded combustion mode. The parameters are evaluated to determine if the engine is operating in a warmed-up steady-state condition, and are associated with enable criteria that are required to successfully execute the monitoring routine 200 to achieve a result. The monitored parameters include EGR flowrate, which is evaluated to determine that a minimum EGR flowrate is commanded and to determine that a time-rate change in the EGR flowrate (ΔEGR) is less than a maximum value. The monitored parameters also include fuel injection mass, which is evaluated to determine that the commanded fuel flow is greater than a minimum flowrate and less than a maximum flowrate, and that a time-rate change in the fuel injection mass is less than a maximum value. The monitored parameters also include engine speed, which is evaluated to determine that the engine speed is greater than a minimum, e.g., greater than idle and less than a maximum speed. The monitored parameters also include engine coolant temperature, which is evaluated to determine that the engine temperature is greater than a minimum, indicating that the engine is in a warmed-up condition. The monitored parameters also include a commanded combustion mode, which is evaluated to determine whether any intrusive engine operations have been commanded such as an exhaust regeneration mode for regenerating a particulate filter. The commanded combustion mode may also include determining whether the engine is operating in an all-cylinder mode and other related engine operating states that may affect operation of the EGR system. When the evaluation of the monitored parameters indicates that the engine is warmed up and is operating in a substantially steady-state condition without occurrence of intrusive engine operations (204)(1), execution of the monitoring routine 200 proceeds. Otherwise, (204)(0), execution of further elements of the monitoring routine 200 is forestalled and monitoring of the parameters is repeated (202).

Monitoring the EGR cooler bypass valve is an intrusively executed two-step procedure that includes commanding the EGR cooler bypass valve to a first state, e.g., a closed state for a period of time and monitoring thermal efficiency in the EGR system, and then commanding the EGR cooler bypass valve to a second state, e.g., an open state for a period of time and again monitoring thermal efficiency in the EGR system. This operation includes commanding the EGR cooler bypass valve to a fully-open state for a preset period of time (206) and monitoring temperatures upstream and downstream of the EGR cooler. This can include monitoring signal outputs from an EGR inlet temperature sensor and an EGR outlet temperature sensor.

An initial cooler efficiency is calculated based upon the upstream and downstream temperatures at the beginning of commanding the EGR cooler bypass valve to the fully-open state, and a final cooler efficiency is calculated based upon the upstream and downstream temperatures at the end of the preset period of time of commanding the EGR cooler bypass valve to the fully-open state. A first thermal efficiency gradient $\eta_{bypass}$ is calculated based upon a difference between the initial and final cooler efficiencies with the EGR cooler bypass valve in the fully-open state (208). This calculation can be in the form of a ratio of the initial and final cooler efficiencies or an arithmetic difference in the initial and final cooler efficiencies, or another suitable parameter calculated based upon the initial and final cooler efficiencies. When the EGR cooler bypass valve is functioning in accordance with its expected operation and there are no other faults or flow restrictions in the EGR system, the expected thermal efficiency gradient $\eta_{bypass}$ will indicate a minimal change in the cooler efficiency with the EGR cooler bypass valve in the fully-open state over the course of the preset time period.

The operation proceeds to commanding the EGR cooler bypass valve to a fully-closed state for a preset period of time (210) and monitoring temperatures upstream and downstream of the EGR cooler. An initial cooler efficiency is calculated based upon the upstream and downstream temperatures at the beginning of commanding the EGR cooler bypass valve to the fully-closed state, and a final cooler efficiency is calculated based upon the upstream and downstream temperatures at the end of the preset period of time of commanding the EGR cooler bypass valve to the fully-closed state. A second thermal efficiency gradient $\eta_{cooler}$ is calculated based upon a difference between the initial and final cooler efficiencies with the EGR cooler bypass valve in the fully-closed state (212). This calculation can be in the form of a ratio of the initial and final cooler efficiencies or an arithmetic difference in the initial and final cooler efficiencies, or another suitable parameter calculated based upon the initial and final cooler efficiencies. When the EGR cooler bypass valve is functioning in accordance with its expected operation and there are no other faults or flow restrictions in the EGR system, the expected thermal efficiency gradient $\eta_{cooler}$ will indicate a maximal change in the cooler efficiency with the EGR cooler bypass valve in the fully-closed state over the course of the preset time period.

A difference between the first thermal efficiency gradient $\eta_{bypass}$ and the second thermal efficiency gradient $\eta_{cooler}$ is calculated (214) and evaluated to determine whether the difference exceeds a threshold (216).

When the EGR cooler bypass valve is functioning in accordance with its expected operation and there are no other faults or flow restrictions in the EGR system, the difference between the first thermal efficiency gradient $\eta_{bypass}$ and the second thermal efficiency gradient $\eta_{cooler}$ is expected to be relatively large. A threshold difference can be determined for a specific EGR system configuration indicating the EGR cooler bypass valve is functioning in accordance with its expected operation while taking into account variabilities in parts, systems, operating conditions and ambient conditions.

Thus, when the difference between the first thermal efficiency gradient $\eta_{bypass}$ and the second thermal efficiency gradient $\eta_{cooler}$ is greater than the threshold difference (216)(1), the routine indicates that the EGR cooler bypass valve is functioning in accordance with its expected operation (218), and execution ends.

When the difference between the first thermal efficiency gradient $\eta_{bypass}$ and the second thermal efficiency gradient $\eta_{bypass}$ is less than the threshold difference (216)(1), the routine indicates that the EGR cooler bypass valve is not functioning in accordance with its expected operation (220), and execution ends. This result may be further analyzed, including commanding a re-execution of the monitoring routine 200 to verify the result or informing the vehicle operator through illumination of a malfunction indicator lamp.

Using EGR cooler efficiency to monitor the EGR cooler bypass valve improves signal/noise ratios by reducing variations caused by driver demand and operation of the engine cooling system as compared to a monitoring system that is based upon EGR cooler outlet temperature. This monitoring system executes when the engine is off-idle to avoid in-use flowrate issues from stop/start and run-in conditions. Elevated exhaust temperature associated with engine operation off-idle improves the diagnostic signal/noise ratio.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for monitoring an internal combustion engine, comprising:
   monitoring thermal efficiency in a heat exchanger of an exhaust gas recirculation (EGR) system with a flow control valve commanded to a first state and then monitoring thermal efficiency in the heat exchanger with the flow control valve commanded to a second state;
   evaluating the flow control valve based upon the monitored thermal efficiencies, wherein evaluating the flow control valve based upon the monitored thermal efficiencies includes:
      determining a first thermal efficiency gradient based upon a difference between an initial efficiency and a final efficiency with the flow control valve commanded to the first state,
      determining a second thermal efficiency gradient based upon a difference between an initial efficiency and a final efficiency with the flow control valve commanded to the second state, and
      evaluating the flow control valve based upon the first and second thermal efficiency gradients; and
   identifying, via illumination of a malfunction indicator lamp, a fault with the flow control valve when a difference between the first and second thermal efficiency gradients is less than a threshold value.

2. The method of claim 1, wherein the monitoring of thermal efficiency in a heat exchanger of an EGR system with a flow control valve commanded to a first state and then monitoring thermal efficiency in the heat exchanger with the flow control valve commanded to a second state comprises monitoring thermal efficiency in the heat exchanger with the flow control valve commanded to an open state and then monitoring thermal efficiency in the heat exchanger with the flow control valve commanded to a closed state.

3. The method of claim 1, wherein the monitoring of thermal efficiency in a heat exchanger of an EGR system with a flow control valve commanded to a first state and then monitoring thermal efficiency in the heat exchanger with the flow control valve commanded to a second state comprises monitoring thermal efficiency in the heat exchanger with the flow control valve commanded to a closed state and then monitoring thermal efficiency in the heat exchanger with the flow control valve commanded to an open state.

4. The method of claim 1, wherein determining the first thermal efficiency gradient based upon an initial efficiency and a final efficiency with the flow control valve commanded to the first state comprises:
   monitoring initial temperatures upstream and downstream of the heat exchanger and determining an initial efficiency for the heat exchanger based upon said initial temperatures;
   commanding the flow control valve to the first state for a preset time period;
   monitoring final temperatures upstream and downstream of the heat exchanger after the preset time period elapses and determining a final efficiency for the heat exchanger based upon said final temperatures; and
   determining the first thermal efficiency gradient based upon the initial efficiency and the final efficiency.

5. The method of claim 4, wherein commanding the flow control valve to the first state for a time period comprises commanding the flow control valve to an open state for the time period.

6. The method of claim 4, wherein the commanding the flow control valve to the first state for a time period comprises commanding the flow control valve to closed state for the time period.

7. The method of claim 1, wherein the determining a second thermal efficiency gradient based upon an initial efficiency and a final efficiency with the flow control valve commanded to the second state comprises:
   monitoring initial temperatures upstream and downstream of the heat exchanger and determining an initial efficiency for the heat exchanger based upon said initial temperatures;
   commanding the flow control valve to the second state for a preset time period;
   monitoring final temperatures upstream and downstream of the heat exchanger after the preset time period elapses and determining a final efficiency for the heat exchanger based upon said final temperatures; and
   determining the second thermal efficiency gradient based upon the initial efficiency and the final efficiency.

8. The method of claim 7, wherein the commanding the flow control valve to the second state for a preset time period comprises commanding the flow control valve to an open state for the preset time period.

9. The method of claim 7, wherein the commanding the flow control valve to the second state for a preset time period comprises commanding the flow control valve to a closed state for the preset time period.

10. The method of claim 1, further comprising operating the internal combustion engine in an off-idle condition during the monitoring of the heat exchanger of the EGR system.

* * * * *